United States Patent [19]
Thies

[11] Patent Number: 6,004,571
[45] Date of Patent: Dec. 21, 1999

[54] SIMULATED INSECT EGGS

[76] Inventor: Curt Thies, c/o Thies Technology, 3720 Hampton, Suite 207, St. Louis, Mo. 63109-1438

[21] Appl. No.: 08/923,654

[22] Filed: Sep. 4, 1997

[51] Int. Cl.$^6$ .............................. A61K 9/50; A61K 9/64
[52] U.S. Cl. ........................ 424/410; 424/450; 424/490
[58] Field of Search .................... 264/4, 4.1, 4.3, 264/4.33, 4.7; 427/2.22, 213.31, 213.35, 213.33, 213.34, 334, 338; 435/404, 178, 240.22, 288, 240.4; 119/6.7, 6.8, 6.5, 6.6, 174; 424/84, 4, 450–452, 455, 489–495, 410, 520

[56] References Cited

U.S. PATENT DOCUMENTS

| | | | |
|---|---|---|---|
| 4,049,460 | 9/1977 | Broadbent | 424/84 |
| 4,350,679 | 9/1982 | Mizuno et al. | 424/456 |
| 4,707,355 | 11/1987 | Wilson | 424/84 |
| 4,874,611 | 10/1989 | Wilson et al. | 424/410 |
| 5,799,607 | 9/1998 | Greany et al. | 119/6.5 |

*Primary Examiner*—Jean C. Witz
*Attorney, Agent, or Firm*—Fish & Richardson P.C.

[57] ABSTRACT

An artificial insect egg has a droplet of insect nutrient, and a thin interfacially polymerized shell enclosing the nutrient. A thin water barrier material coating may enclose the shell. The shell has a strength corresponding substantially to that of an insect shell constructed and arranged to be sufficiently strong to allow handling by tweezers without breaking while being sufficiently weak to allow breaking by an insect to allow the insect to withdraw the nutrient.

4 Claims, 1 Drawing Sheet

SIMULATED INSECT EGGS

BACKGROUND

The present invention relates in general to simulating insect eggs.

Microcapsules loaded with an artificial diet for insects have been produced and used to rear beneficial insects, such as chrysopia carnea (green lace wing), that may be used as a biological test control agent for boll worms and tobacco bud worms on cotton.

SUMMARY

It is an important object of the invention to provide microcapsules that simulate insect eggs, and methods of making these artificial insect eggs with an enclosed insect nutrient.

According to the invention, first, emulsify or extrude dropwise diet phase in $H_2O$-immiscible organic phase to form droplets of diet dispersed in the organic phase. Second, add a crosslinking agent to the organic phase to form a crosslinked capsule shell enclosing the diet. A suitable crosslinking agent in the organic phase is a multifunctional acid chloride or isocyanate, or other suitable agent. The diffusion of the crosslinking agent plus an oil/$H_2O$ interface where it reacts forms via crosslinking a capsule shell. The crosslinking agent reacts with ingredients (reactive) in the droplet of aqueous diet. Proteins are typically the coreactant. To make the shell stronger, it is advantageous to add protein to the diet before the step of emulsifying or extruding dropwise the diet phase. Gelatin is an example of a suitable protein, but casein and other proteins may be used. The insect diet droplet may be a water solution/dispersion of proteins, carbohydrates, vitamins, hormones, fatty material and/or other suitable components. Typically a complex mixture of nutrients form the insect diet droplet.

Third, immerse the capsules formed in the preceding step in molten wax, or a solution of wax in a volatile organic solvent to form a thin wax shell on the outer surface of the capsule to provide a barrier to $H_2O$ loss. Fourth, drain away the wax melt or solvent, allow the capsules to cool and dry and then use them as an insect nutrient.

The artificial insect egg thus formed has a thin, but strong shell of protein (or other polymer) crosslinked with the crosslinking agent with a thin outer wax, or other solid thin film that acts as a $H_2O$ barrier, but is so thin, small insects can penetrate it.

Other features, objects and advantages of the invention will become apparent from the following detailed description when read in connection with the accompanying drawings in which:

DETAILED DESCRIPTION

Figure 1:
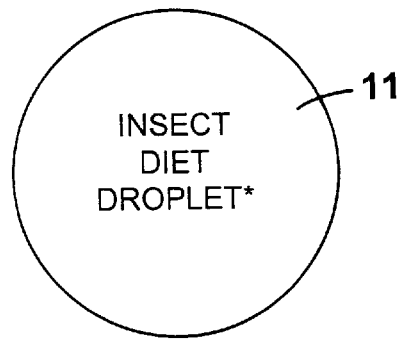
FIG. 1 is a representation of an insect diet droplet.

With reference now to the drawings, and more particularly FIG. 1 thereof, there is shown a diagrammatic representation of an insect diet droplet 11, which typically may be a water solution/dispersion of protein, carbohydrates, vitamins, hormones, fatty materials and/or other suitable nutrients. The specific apparatus and methods for forming the droplets is not a part of the invention. A suitable apparatus and method is disclosed in Thies et al. U.S. Pat. No. 5,441,878 granted Aug. 15, 1995, entitled PREPARATION OF UNIFORM DROPLETS BY USING GAS PRESSURE TO FORCE LIQUID FROM A SYRINGE AND FLOWING GAS TO DETACH DROPLETS.

Drop-forming devices may expel droplets one at a time through an orifice into air. The droplets may then fall into a curing bath. Alternatively, drop-forming devices can extrude droplets through a nozzle immersed in a fluid (static or moving) whereby the droplets are brought into contact with the curing bath. The curing agent may be downstream from where the drop is initially formed, but the drop is suitably carried to the curing stream. Still another approach is to spray the droplets through a multi-orifice nozzle. Still another way is to form droplets by ultrasonic vibration or atomization.

The '878 patent describes forming droplets in the range of 5 $\mu$m to 4 mm in diameter. A suitable range of droplet diameter is believed to be up to at least 3 mm and preferably up to at least about 1 mm.

FIG. 1 illustrates a first step to emulsify (or extrude dropwise) the diet phase in $H_2O$-immiscible organic phase to provide droplets of diet dispersed in the organic phase.

Figure 2:
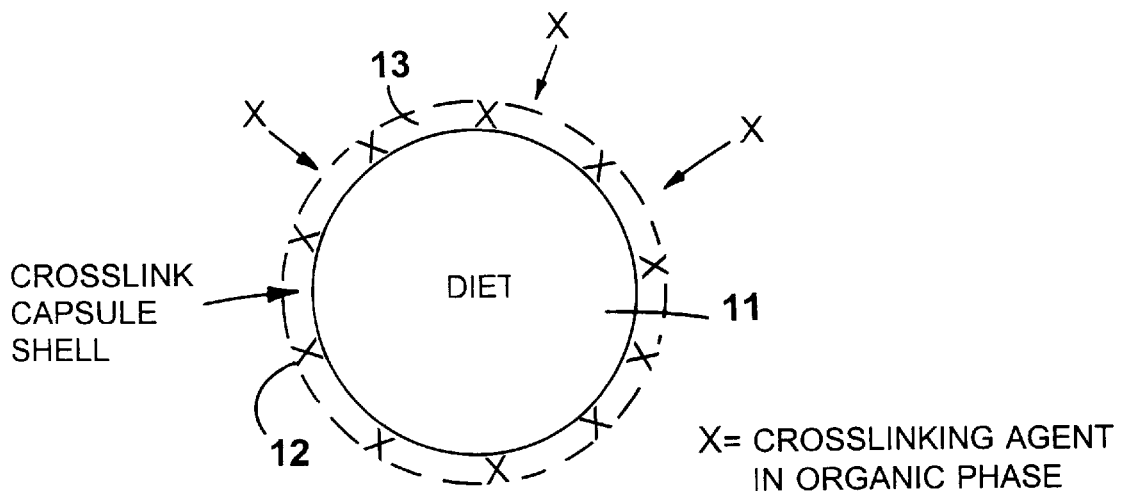
FIG. 2 is a diagrammatic representation of the formation of the crosslink capsule shell around the insect diet droplet of FIG. 1.

Referring to FIG. 2, there is illustrated the second step of adding a crosslinking agent 12 to the organic phase to create a crosslinked capsule shell 13 enclosing diet droplet 11. FIG. 2 illustrates the diffusion of the crosslinking agent with an oil/$H_2O$ interface where it reacts to form (via crosslinking the capsule shell 13. The crosslinking agent X reacts with ingredients (reactive) in the droplet 11 of aqueous diet. Proteins are the coreactant. A suitable crosslinking agent is a multifunctional acid chloride or isocyanate, typically but may be other crosslinking agents. It is advantageous to add protein to the diet droplet 11 before the first step. Gelatin is a suitable example, but casein and other proteins may be used.

The next step is to immerse the capsule formed in the preceding step illustrated in FIG. 2 in molten wax, or a solution of wax in a volatile organic solvent to form a thin wax shell on the outer surface of the capsule to provide a barrier to $H_2O$ loss.

In the next step, drain away the wax melt or solution, let the capsules cool and dry, and the capsules are then ready for use in furnishing nutrients to insects.

Figure 3:
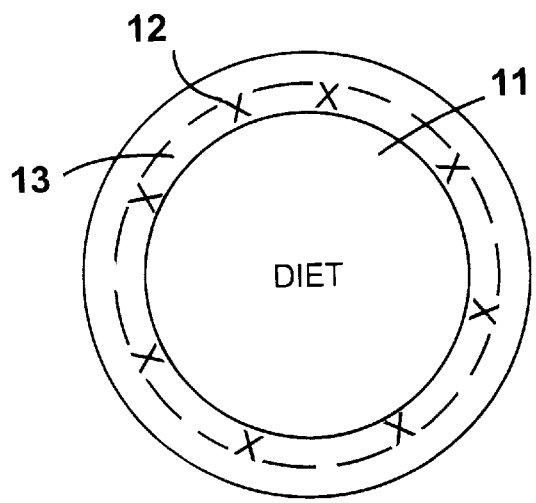
FIG. 3 is a diagrammatic representation of an artificial insect egg according to the invention.

Referring to FIG. 3, there is a shown a diagrammatic representation of the finished artificial insect egg. A thin but strong shell of protein (or other polymer) crosslinked as shown in FIG. 2 encloses the insect diet droplet 11. A thin outer wax coating 13 (or other solid thin film) encloses shell 12 and acts as an $H_2O$ barrier but is so thin, small insects penetrate it.

In a specific process for producing artificial insect eggs with a diameter range of 400–600 $\mu$m, gelatin, such as 100 Bloom, was dissolved in the nutrient mixture. The nutrient dissolved gelatin solution was emulsified into a water-immiscible solvent containing an emulsifier. Then a multi-functional isocyanate was added to the system, and the isocyanate was allowed to react with the gelatin and nutrient amine groups to form a solid capsule shell that encapsulated the mixture.

In a specific procedure, 95 grams of nutrient were weighed into a 20 ml glass vial, and 0.5 gm of gelatin was added. The gelatin and nutrient mixture was mixed with a magnetic stir bar. It may be necessary to heat the mixture to dissolve the gelatin into the nutrient mixture. If the gelatin is at least 100 Bloom, the mixture may be heated at a temperature sufficiently high for sufficiently long time to dissolve the gelatin. The next step was to add 102 ml of Isopar M to a plastic beaker, along with 2.0281 of centrophase 31. This solution was then mixed in order to make sure the centrophase was dissolved completely in the Isopar M. The next step was to drop at most two drops of the nutrient/gelatin mixture 11 into the Isopar M/centrophase mixture. Then, 18 ml of Desmondur W was added to the whole solution. This produced a 2%, 15% and 83mixture for the centrophase 31 Desmondur W and Isopar M, respectively. The solution was then mixed for 2–4 hours with a three-blade impeller at about 300 rpm. The motor was then turned off, and the capsules were allowed to remain in the solution overnight.

The next day, a water bath was heated to 70° C. A plastic beaker, which contained parafilm wax was placed into the heated water bath. When all the wax was melted, one capsule was removed from the Isopar M solution with tweezers and placed in the melted wax. This capsule was then removed from the wax and dropped into a beaker of heptane. The heptane was then allowed to dissolve the excess wax from the capsule. When it appeared that most of the wax had been removed from the capsule, the capsule was removed from the heptane and placed on a weighing paper to dry.

A suitable solvent dissolves a chemical contained in the isocyanate group. Mygliol is suitable for dissolving Desmondur W and also Mondur MRS with a little dibutyl thalate added. Isopar M is also suitable for dissolving Desmondur W, and is less oily than mygliol but does not dissolve Mondur MRS.

It is preferred that the capsules being made be very similar to natural insect eggs with a shell sufficiently strong to be manageable by tweezers, yet sufficiently weak so that insects can recover the enclosed nutrients. Mondur MRS may be preferable because Desmondur W is a sensitizer that can cause allergic reactions and should be used in a fume hood.

While ideally no gelatin is used, the addition of gelatin has advantages as explained above. The isocyanate preferably reacts with amine groups in the nutrients to form a wall around the nutrients. If there are not enough amine groups in the nutrient itself to create a strong enough wall, it is advantages to dissolve the gelatin into the nutrients to add more amine groups to react with the crosslinking agent. The higher the gelatin's bloom, the more reactive it will be with the isocyanate to produce a stronger encapsulating wall. It was discovered that between 0 and 100 bloom gave the best results.

Preferably, the solution is stirred with a three-blade impeller between 300 and 400 rpm that produce capsules with diameters in the range between 300 and 2000 µm. There tended to be a little aggregation; however, each capsule was easily separated from the other.

There has been described novel artificial insect eggs and methods of making having numerous advantages. It is expected that the invention has reduced insect diet losses from spoilage caused by bacterial contamination. Insect larvae can more easily drain the diet from the small capsules according to the invention.

An important feature of the invention resides in producing a thin, but strong, capsule shell by interfacial polymerization, using a component of the diet, and/or something added to the diet, such as gelatin, casein or other suitable component, that can react chemically with a coreactant located in the water-immiscible phase (multifunctional isocyanate or acid chlorides are prime nonlimiting examples) to form a crosslinked thin capsule shell that encloses the droplet of diet solution or suspension. Coupled with overcoating (if deemed desirable to minimize water loss on storage) the capsule shell with a thin film of water barrier material like a natural wax, such as beeswax, carnauba and other suitable materials or a manmade wax, such as paraffin wax, or a low molecular weight polyethylene often recognized as a wax-like material, functioning as a water barrier material as distinguished from a structural component.

It is evident that those skilled in the art may now make numerous uses and modifications of and departures from the specific structures and techniques described herein without departing from the inventive concepts. Consequently, the invention is to be construed as embracing each and every novel feature and novel combination of features present in or possessed by the structure and techniques disclosed herein, and limited only by the spirit and scope of the appended claims.

What is claimed is:

1. An artificial insect egg comprising;
    (a) a droplet of insect nutrient,
    (b) an interfacially polymerized shell enclosing said nutrient; and
    (c) a water barrier material coating said shell, wherein said coated shell may be handled with tweezers without breaking while allowing an insect to withdraw said nutrients.

2. The artificial insect egg according to claim 1, wherein said water barrier material is wax.

3. A method of making the artificial insect egg of claim 1 comprising:
    (a) forming a droplet of insect nutrient,
    (b) forming a shell enclosing said nutrient by interfacial polymerization wherein a component of said droplet reacts chemically with a co-reactant located in the water-immiscible phase to form a cross-linked capsule shell that encloses said insect nutrient; and
    (c) overcoating said shell with a film of a water barrier material.

4. The method according to claim 3, wherein said water barrier material is wax.

* * * * *